3,790,564
TRIENIC STEROIDS, PROCESS OF THEIR PREPARATION AND METHODS OF THEIR USE
André Pierdet, Noisy-le-Sec., and Geneviève Azadian, Paris, France, assignors to Roussel-UCLAF, Paris, France
No Drawing. Filed Aug. 15, 1972, Ser. No. 280,852
Claims priority, application France, Aug. 26, 1971, 7131032
Int. Cl. C07c *173/00*
U.S. Cl. 260—239.55 C                    9 Claims

ABSTRACT OF THE DISCLOSURE

Ethynylated trienic steroids having the formula

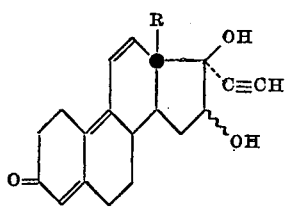

wherein R represents alkyl having 1 to 3 carbon atoms and the ∼OH in the 16 position is selected from the group consisting of the α-OH and the β-OH; as well as processes for the preparation of the compounds, intermediates in the process, therapeutic compositions containing the compounds and the method of preventing pregnancy in warm-blooded animals by administration of the compounds.

OBJECTS OF THE INVENTION

An object of the present invention is the obtaining of ethynylated trienic steroids having the formula

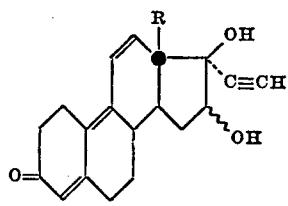

wherein R represents alkyl having 1 to 3 carbon atoms and the ∼OH in the 16 position is selected from the group consisting of the α-OH and the β-OH.

Another object of the present invention is the development of a process for the production of said ethynylated trienic steroids consisting essentially of the steps of (1) reducing the aromatic ring bond of a compound having the formula

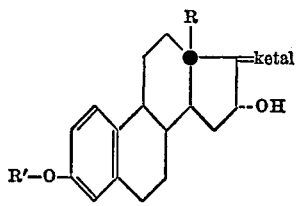

wherein R represents alkyl having 1 to 3 carbon, R' represents lower alkyl and ketal represents a ketal of the 17-ketone, by the action of an alkali metal in liquid ammonia in the presence of a lower alkanol, (2) selectively hydrolyzing the enolic ether in the 3 position of the resulting dienic compound having the formula

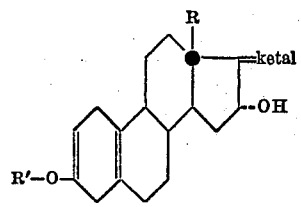

wherein R, R' and ketal have the above-assigned values, by the action of an organic carboxylic acid having 2 to 6 carbon atoms, (3) brominating the resulting $\Delta^{5(10)}$-steroid having the formula

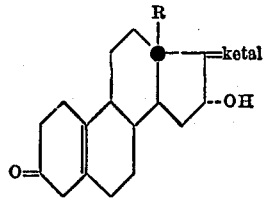

wherein R and ketal have the above-assigned values, by the action of a brominating agent in an alkaline medium followed by dehydrobromination, (4) by hydrolyzing the resulting $\Delta^{4,9}$-dienic steroid having the formula

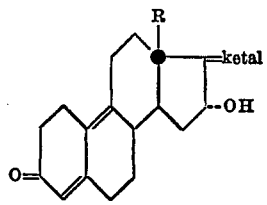

wherein R and ketal have the above-assigned values, by the action of an aqueous strong acid, (5) selectively ketalizing the 3-ketones of the resulting $\Delta^{4,9}$-diene steroid having the formula

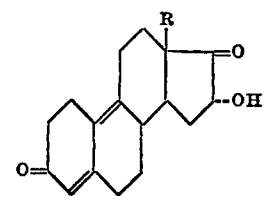

wherein R has the above-assigned values, by the action of a ketalizing agent in the presence of a ketalization catalyst, (6) ethynylating the resulting 3-ketal having the formula

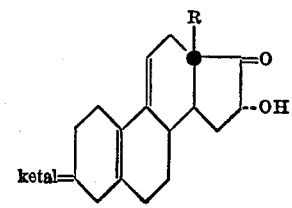

wherein R and ketal have the above-assigned values, by the action of a metallic ethynylating reactant, (7) recovering the 17α-ethynyl compound having the formula

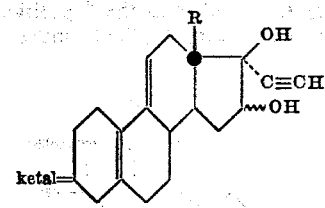

wherein R and ketal have the above-assigned values and the ~OH in the 16 position is selected from the group consisting of the α-OH and the β-OH, (8) hydrolyzing the said 17α-ethynyl compound by the action of an acid to remove the ketal, (9) dehydrogenating the resulting Δ⁵⁽¹⁰⁾,⁹⁽¹¹⁾-dienone having the formula

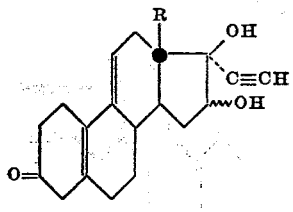

wherein R and ~OH have the above-assigned values, by the action of a dehydrogenating substituted p-benzoquinone, and (10) recovering said ethynylated trienic steroids.

A further object of the invention is the obtaining of the novel intermediates:

(1) 17-ketals of Δ⁵⁽¹⁰⁾-enolones having the formula

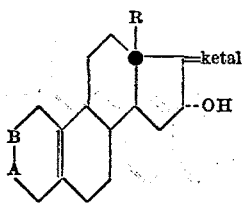

wherein R represents alkyl having 1 to 3 carbon atoms, A and B are paired members selected from the group consisting of (1) >C=O and —CH₂— respectively, and (2)

lower alkyl and —CH= respectively, and ketal represents a member selected from the group consisting of di-alkoxy having 1 to 4 carbon atoms in the alkoxy, and alkylenedioxy having 2 to 4 carbon atoms in the alkylene;

(2) Δ⁴,⁹-dienic steroids having the formula

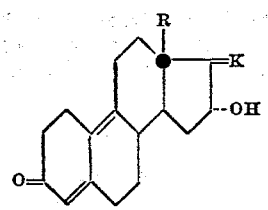

wherein R represents alkyl having 1 to 3 carbon atoms and K represents a member selected from the group consisting of oxygen, di-alkoxy having 1 to 4 carbon atoms in the alkoxy, and alkylenedioxy having 2 to 4 carbon atoms in the alkylene; and (3) Δ⁵⁽¹⁰⁾,⁹⁽¹¹⁾-dienic steroids having the formula

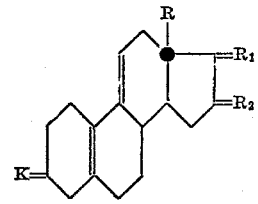

wherein R represents alkyl having 1 to 3 carbon atoms, R₁ represents a member selected from the group consisting of

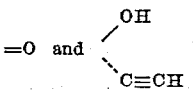

R₂ represents a member selected from the group consisting of

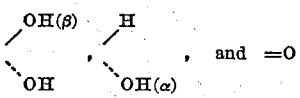

and K represents a member selected from the group consisting of oxygen, di-alkoxy having 1 to 4 carbon atoms in the alkoxy, and alkylenedioxy having 2 to 4 carbon atoms in the alkylene.

A yet further object of the present invention is the obtaining of therapeutic compositions containing a safe but effective amount of said ethynylated trienic steroids.

A still further object of the present invention is the development of a method of preventing pregnancy in warm-blooded animals by administering a therapeutic composition containing said ethynylated trienic steroids.

These and other objects of the invention will become more apparent as the description thereof proceeds.

DESCRIPTION OF THE INVENTION

The above objects have been achieved by our new trienic 16-hydroxylated steroidal compounds of the General Formula I

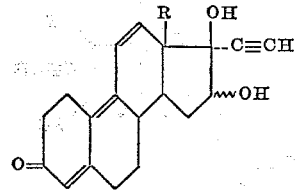

in which R represents alkyl having 1 to 3 carbon atoms and the hydroxy in the 16 position is either in the α position or the β position, with reference to the plane of the steroid. The compounds of Formula I are endowed with interesting physiological properties. They possess particularly an anti-nidatory and anti-hormonal activity. They are suitable in addition for preventing pregnancy both in animals as in humans. They are endowed with inhibiting properties on the hypophysical secretions with a clear anti-LH predominance, with anti-estrogenic properties and with anti-progesterone properties.

Among the compounds of Formula I, more particularly are:

(a) 3β-ethyl-17α-ethynyl-Δ⁴,⁹,¹¹-gonatrien-16α,17β-diol-3-one (R=C₂H₅, 16 ~OH=16α OH)
(b) 13β-ethyl-17α-ethynyl-Δ⁴,⁹,¹¹-gonatrien-16β,17β-diol-3-one (R=C₂H₅, 16 ~OH=16β OH).

The compounds of Formula I can be utilized for controlling and regularizing excessive secretions of progesterone in the case of uterine hemorrhages due to deciduiforms metritis, and in the case of dysmenorrhea or amenorrhea.

They can be administered parenterally, orally, rectally or perlingually. To this effect, they are prepared in the form of injectable solutions or suspensions, packed in ampules, in auto-injectable syringes or in multidose flacons, in the form of bare or coated tablets, of gelules, of sublingual tablets, of syrups or emulsions, of granules or of aromatized powders. For rectal administration they are prepared in the form of suppositories.

The pharmaceutical forms can contain, in addition, one or several other active principles of complementary action. In all these pharmaceutical forms, the compounds of Formula I are present in a minor amount together with a major amount of a pharmaceutical excipient.

The daily dosage of compounds of Formula I is controlled between 0.002 mg./kg. to 0.2 mg./kg. in the warm-blooded animal, particularly for the prevention of pregnancy, and between 0.1 mg. and 10 mg. in humans. The single dose is between 0.1 mg. and 2 mg. As is common, the dosage varies as a function of the age and weight of the patient.

The invention also equally concerns a process for the preparation of the compounds of Formula I. This process of preparation consisting essentially of the steps of (1) reducing the aromatic ring of a 17-ketal of 3-alkoxy-13β-R-Δ$^{1,3,5(10)}$-gonatrien-16α-ol-17-one of the Formula II:

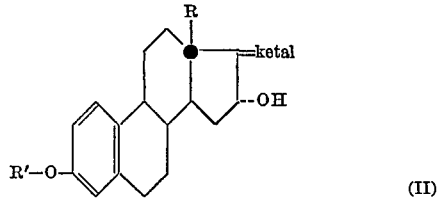

(II)

wherein R represents alkyl having 1 to 3 carbons, R' represents lower alkyl and ketal represents a ketal of the 17 ketone, by the action of an alkali metal in liquid ammonia in the presence of a lower alkanol, (2) selectively hydrolyzing the enolic ether in the 3 position of the resulting dienic compound having the Formula III:

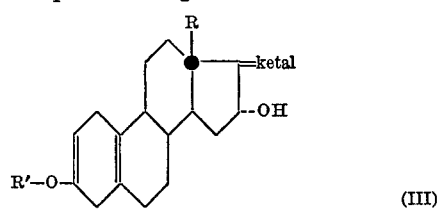

(III)

wherein R, R' and ketal have the above-assigned values, by the action of an organic carboxylic acid having 2 to 6 carbon atoms, (3) brominating the resulting Δ$^{5(10)}$-steroid having the Formula IV:

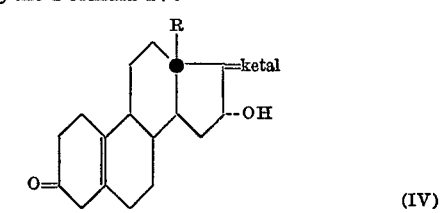

(IV)

wherein R and ketal have the above-assigned values, by the action of a brominating agent in an alkaline medium followed by dehydrobromination, (4) hydrolyzing the ketal in the 17 position of the resulting Δ$^{4,9}$-dienic steroid having the Formula V:

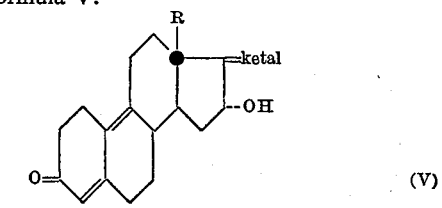

(V)

wherein R and ketal have the above-assigned values, by action of an acid, (5) selectively ketalizing the 3-ketone of the resulting Δ$^{4,9}$-dienone steroid having the Formula VI:

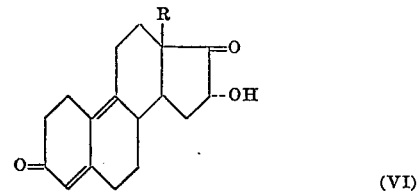

(VI)

wherein R has the above-assigned values, by the action of a ketalizing agent in the presence of a ketalization catalyst, (6) ethynylating the resulting 3-ketal having the Formula VII:

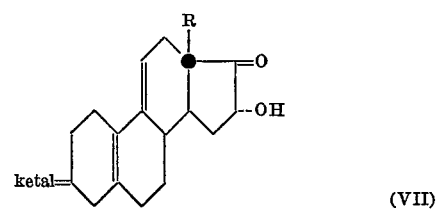

(VII)

wherein R and ketal have the above-assigned values, by the action of an organometallic reactant carrying an ethynyl group, (7) recovering a 17α-ethynyl compound having the Formula VIII:

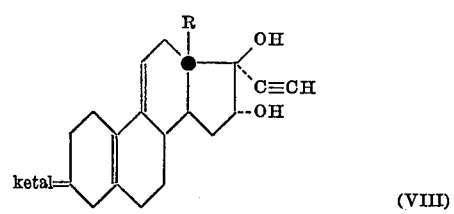

(VIII)

wherein R and ketal have the above-assigned values, (8) optionally subjecting the compound of Formula VIII to the action of an oxidation reactant, (9) reacting the 16-ketone having the Formula X:

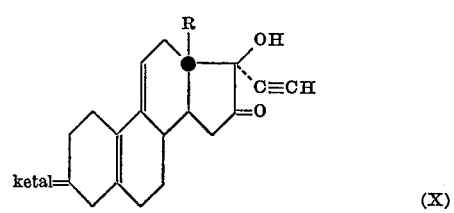

(X)

wherein R and ketal have the above-assigned values, with a ketonic reducing agent, (10) recovering the 16β-hydroxy compound having the Formula XI:

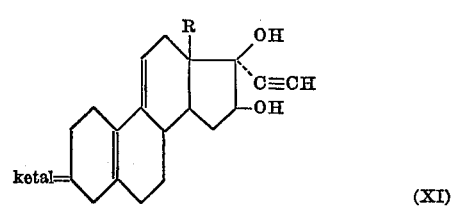

(XI)

wherein R and ketal have the above-assigned values, (11) hydrolyzing in an acidic media the ketal in the 3 position either of Compound VIII or of Compound XI, (12) obtaining respectively 13β-R-17α-ethynyl-Δ⁵⁽¹⁰⁾,⁹⁽¹¹⁾-gonadien-16α,17β-diol-3-one having the Formula IX:

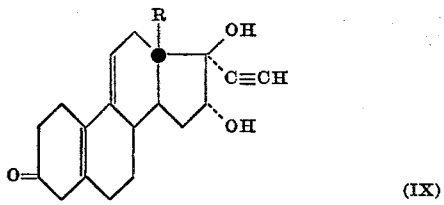

(IX)

wherein R has the above-assigned values, or 13β-R-17α-ethynyl-Δ⁵⁽¹⁰⁾,⁹⁽¹¹⁾-gonadien-16β,17β-diol-3-one having the Formula XII:

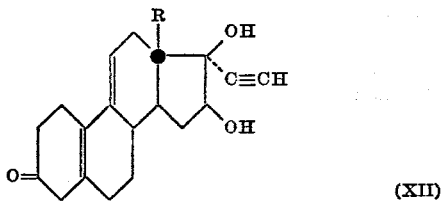

(XII)

wherein R has the above-assigned values, and (13) subjecting either Compound IX or Compound XII to the action of a dehydrogenating substituted p-benzoquinone in order to obtain respectively the desired 13β-R-17α-ethynyl-Δ⁴,⁹,¹¹-gonatrien-16α,17β-diol-3-one or 13β-R-17α-ethynyl-Δ⁴,⁹,¹¹-gonatrien-16β,17β-diol-3-one.

The process of the invention is executed advantageously as follows:

(1) The starting materials of Formula II are those where "ketal" represents a member selected from the group consisting of di-alkoxy having 1 to 4 carbon atoms in the alkoxy and alkylenedioxy having 2 to 4 carbon atoms in the alkylene, preferably ethylenedioxy and where R' is methyl. The alkyl ketals in the 17 position of 3-lower alkoxy-13β-R-Δ¹,³,⁵⁽¹⁰⁾-gonatrien-16α-ol - 17 - ones, II, are obtained according to a process analogous to that described in French Pat. No. 1,476,573. This consists essentially in subjecting a 3-lower alkoxy-13β-R-Δ¹,³,⁵⁽¹⁰⁾-gonatrien-16α-ol-17-one to the action of a ketalizing agent in an acidic medium. The 3-lower alkoxy-Δ¹,³,⁵⁽¹⁰⁾-estratrien-16α-ol-17-one are described in U.S. Pat. No. 2,950,-292.

(2) The alkali metal utilized to effect the Birch reaction on the ketal in the 17 position of the 3-lower alkoxy-13β-R-Δ¹,³,⁵⁽¹⁰⁾-gonatrien-16α-ol-17-one, II, in step (1) is particularly sodium, potassium or lithium. The lower alkanol, in the presence of which the Birch reaction is effected, is particularly methanol, ethanol, isopropanol or tert.-butanol.

(3) The organic carboxylic acid having 2 to 6 carbon atoms utilized to effect the selective hydrolysis of the enolic ether in the 3 position of the 3-lower alkoxy-13β-R-17-ketal-Δ²,⁵⁽¹⁰⁾-gonadien-16α-ol, III, in step (2) is particularly acetic acid, oxalic acid or citric acid.

(4) The brominating and dehydrobromination agent utilized to treat the 13β-R-17-ketal-Δ⁵⁽¹⁰⁾-gonen-16α-ol-3-one, IV, in step (3) is preferentially pyridinium perbromide in the presence of pyridine.

(5) The acid employed for hydrolyzing the ketal function of the 13β-R-17-ketal-Δ⁴,⁹-gonadien-16α-ol-3-one, V, in step (4), is particularly a strong acid such as hydrochloric acid, sulfuric acid or p-toluenesulfonic acid in an aqueous-organic solvent medium. The hydrolysis is effected preferably at elevated temperatures up to the reflux temperature.

(6) The agent of selective ketalization in the 3 position of 13β-R-Δ⁴,⁹-gonadien-16α-ol-3,17-dione, VI, in step (5), is an agent which gives a 3-ketal selected from the group consisting of di-alkoxy having 1 to 4 carbon atoms in the alkoxy and alkylenedioxy having 2 to 4 carbon atoms in the alkylene, such as an alkanol having 1 to 4 carbon atoms, for example, methanol, ethanol, propanol, isopropanol or butanol, an alkyleneglycol having 2 to 4 carbon atoms, for example, ethyleneglycol or propyleneglycol, a dioxolane, for example, 2-methyl-2-ethyl-dioxolane, 2-methyl-2-phenyldioxolane, 2-methyl-4-(4'-methylbenzyl)-dioxolane, 2,2-dimethyl - 4-(4'-methylbenzyl)-dioxolane, 2-chloromethyl-dioxolane, 2β-chloroethyl-dioxolane or 2-methyl-2-isopropenyl-dioxolane. The ketalization reaction is effected in the presence of a ketalization catalyst, preferably of acidic nature, such as hydrochloric acid, perchloric acid, sulfuric acid, p-toluenesulfonic acid, acetyl chloride or boron trifluoride.

(7) The organometallic reactant carrying an ethynyl group utilized to effect 17α-ethynylation of Compound VII in step (6) is particularly an ethynyl magnesium halide, where the halide is the chloride, bromide or iodide, or an acetylide of an alkyl metal such as lithium, sodium or potassium.

(8) The oxidation reactant, to the action of which the 3-ketal-13β-R-17α-ethynyl-Δ⁵⁽¹⁰⁾,⁹⁽¹¹⁾-gonadien - 16α,17β-diol, VIII, is subjected to optional step (8), is particularly chromic oxide, manganese bioxide, N-bromo-succinimide or N-bromo-acetamide. This oxidation step can also be effected by the use of the Oppenauer reaction, by utilizing, as a hydrogen acceptor, a ketone or an aldehyde such as cyclohexanone, benzoquinone, chloranil or anisaldehyde, in the presence of a catalyst such as aluminum phenolate or an aluminum lower alkanolate such as aluminum isopropylate, aluminum butanolate or aluminum pentanolate.

(9) The ketonic reducing agent, to which the 3-ketal-13β-R-17α-ethynyl-Δ⁵⁽¹⁰⁾,⁹⁽¹¹⁾-gonadien-17β-ol-16 - one is subjected in optional step (9), is preferably a metallic hydride such as an alkali metal borohydride or lithium aluminum hydride. This reaction can also be effected according to a Meerwein-Ponndorf reaction by utilizing isopropanol as a source of hydrogen in the presence of aluminum isopropylate as a catalyst.

(10) The acidic media utilized for the hydrolysis of the ketal in the 3 position of Compound VIII or compound XI in Step 11 is particularly acetic acid, oxalic acid, hydrochloric acid, sulfuric acid or p-toluenesulfonic acid.

(11) The dehydrogenating substituted p-benzoquinone, to which action Compound IX or Compound XII is subjected in step (13), is particularly 2,3-dichloro-5,6-dicyano-p-benzoquinone, 2,3-dibromo-5,6-dicyano-p-benzoquinone, 2,3,5,6-tetrachloro-p-benzoquinone, 2,3-dicyano-5-chloro-p-benzoquinone or 2,3-dicyano-p-benzoquinone. The reaction of oxidation by the p-benzoquinone is effected in the presence of an inert organic solvent such as methylene chloride, dichloroethane, benzene, toluene, dioxan, ethyl acetate, dimethylformamide or ethyl ether.

The process which is the object of the invention allows the obtaining of the following novel intermediates.

17-ketals of Δ⁵⁽¹⁰⁾-enolones having the formula

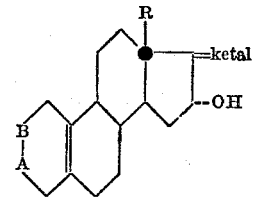

wherein R represents alkyl having 1 to 3 carbon atoms, A and B are paired members selected from the group consisting of (1) >C=O and —CH₂— respectively, and (2)

lower alkyl and —CH= respectively, and ketal represents a member selected from the group consisting of di-alkoxy having 1 to 4 carbon atoms in the alkoxy, and alkylenedioxy having 2 to 4 carbon atoms in the alkylene.

$\Delta^{4,9}$-dienic steroids having the formula

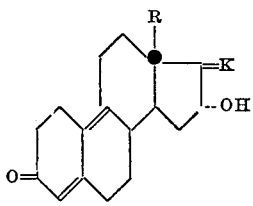

wherein R represents alkyl having 1 to 3 carbon atoms and K represents a member selected from the group consisting of oxygen, di-alkoxy having 1 to 4 carbon atoms in the alkoxy, and alkylenedioxy having 2 to 4 carbon atoms in the alkylene.

$\Delta^{5(10),9(11)}$-dienic steroids having the formula

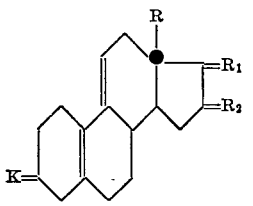

wherein R represents alkyl having 1 to 3 carbon atoms, $R_1$ represents a member selected from the group consisting of

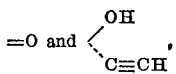

$R_2$ represents a member selected from the group consisting of

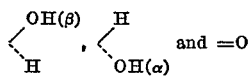

and K represents a member selected from the group consisting of oxygen, di-alkoxy having 1 to 4 carbon atoms in the alkoxy, and alkylenedioxy having 2 to 4 carbon atoms in the alkylene.

The following examples are illustrative of the invention without being limitative in any manner.

EXAMPLE 1

13β-ethyl-17α-ethynyl-$\Delta^{4,9,11}$-gonatriene-16α,17β-diol-3-one

Step A: 3-methoxy-13β-ethyl - 17,17 - ethylenedioxy-$\Delta^{2,5(10)}$-gonadien-16α-ol.—550 cc. of liquid ammonia was cooled to —70° C. under an inert atmosphere, brought to —40° C. and a mixture of 14 gm. of 3-methoxy-13β-ethyl-17,17-ethylenedioxy-$\Delta^{1,3,5(10)}$-gonatrien-16α-ol (described in French Pat. No. 1,476,573), 280 cc. of tetrahydrofuran and 210 cc. of tert.-butanol was added thereto. Then 23 gm. of sodium was added at —35° C. and the mixture was agitated for 45 minutes at —40° C. to —50° C. The ammonia was evaporated. The reaction mixture was brought to room temperature and the excess of sodium was destroyed by addition of 100 cc. of ethanol. The mixture was poured into a mixture of ice and water and extracted with ethyl acetate. The organic phases were washed with water, dried over sodium sulfate and distilled to dryness under vacuum. 15 gm. of 3-methoxy-13β-ethyl-17,17-ethylenedioxy - $\Delta^{2,5(10)}$ - gonadien-16α-ol were obtained which was utilized as such for the following step.

For analysis, the product was recrystallized from ethyl acetate. The melting point was 181° C.

I.R. spectra (chloroform):

Presence of C=C at 1,693 and 1,664 cm.$^{-1}$, of ketal and of OH associated complex.

Step B: 13β - ethyl - 17,17 - ethylenedioxy-$\Delta^{5(10)}$-gonen-16α-ol-3-one.—32 gm. of 3-methoxy-13β-ethyl-17,17-ethylenedioxy-$\Delta^{2,5(10)}$-gonadien-16α-ol and 110 cc. of acetic acid containing 25% of water were agitated for a period of one hour under nitrogen. 300 cc. of water were added to the solution which was then vacuum filtered. The precipitate was washed with water and dried under vacuum to give a raw product weighing 30 gm. On subjecting the raw product to chromatography through silica with elution with a benzene-ethyl acetate mixture (6:4), 19.5 gm. of 13β - ethyl - 17,17-ethylenedioxy-$\Delta^{5(10)}$-gonen-16α-ol-3-one were obtained in the form of a colorless solid product melting at 176° C. and soluble in methylene chloride and insoluble in water.

I.R. spectra (chloroform):

Presence of the non-conjugated ketone at 1,711 cm.$^{-1}$, of ketal and of OH associated complex.

Step C: 13β-ethyl-17,17-ethylenedioxy-$\Delta^{4,9}$-gonadien-16α-ol-3-one.—A mixture was 19.5 gm. of 13β-ethyl-17,17-ethylenedioxy-$\Delta^{5(10)}$-gonen-16α-ol-3-one, 100 cc. of pyridine and 25 gm. of pyridinium perbromide were agitated for one hour and thirty minutes under an atmosphere of nitrogen at room temperature. The suspension was poured into water and brought to a pH of 3 by the addition of 2 N hydrochloric acid. Thereafter the suspension was extracted with methylene chloride. The organic phases were washed with water, dried over sodium sulfate and distilled to dryness under vacuum. 18 gm. of 13β-ethyl-17,17-ethylenedioxy-$\Delta^{4,9}$-gonadien-16α-ol-3 - one were obtained which was utilized as such for the following step.

For analysis, on subjecting the compound to chromatography through silica with elution with a benzene-ethyl acetate mixture (5:5), an amorphous cream colored compound was obtained melting at 148° C.

I.R. spectra (chloroform):

Presence of ketal, of OH and of dienone.

U.V. spectra (ethanol):

Infl. towards 238 nm. $E_{1cm.}^{1\%}=143$

Max. at 304–305 nm. $E_{1cm.}^{1\%}=546$ or $\epsilon=18,800$

Step D: 13β-ethyl-$\Delta^{4,9}$-gonadien-16α-ol-3,17-dione.—A mixture of 18 gm. of 13β-ethyl-17,17-ethylenedioxy-$\Delta^{4,9}$-gonadien-16α-ol-3-one, 180 cc. of acetone and 45 cc. of 2 N hydrochloric acid were heated to reflux for a period of one hour. The solution was then brought to room temperature and poured into water. The mixture was extracted with methylene chloride and the organic phases were distilled to dryness under vacuum. 15 gm. of raw product were recovered to which 7.2 gm. of the same product prepared by another preparation were added. 22.2 gm. of product were subjected to chromatography through silica with elution with benzene-ethyl acetate mixture (5:5). 11 gm. of 13β-ethyl-$\Delta^{4,9}$-gonadien-16α-ol-3,17-dione were obtained which was utilized as such in the following step.

For analysis, the product was recrystallized from ethyl acetate. A solid colorless product was obtained melting at 166° C. and soluble in chloroform and ethanol, and insoluble in water. Its specific rotation was $$[\alpha]_D^{20}=-130°\pm2° \ (c.=0.9\%, CHCl_3)$$

Analysis.—Calculated for $C_{19}H_{24}O_3$ (molecular weight =300.40) (percent): C, 75.97; H, 8.05. Found (percent): C, 75.7; H, 8.1.

I.R. spectra (chloroform):

Presence of associated OH at 3,543 cm.$^{-1}$, of 17-keto at 1,744 cm.$^{-1}$ and of dienone.

U.V. spectra (ethanol):

Max. at 213 nm. $E_{1cm.}^{1\%}=197$

Infl. towards 229 nm. $E_{1cm.}^{1\%}=162$

Infl. towards 236 nm. $E_{1cm.}^{1\%}=154$

Max. at 302 nm. $E_{1cm.}^{1\%}=689$ or $\epsilon=20,700$

Step E: 3,3 - dimethoxy-13β-ethyl-Δ$^{5(10),9(11)}$-gonadien-16α-ol-17-one.—A mixture of 10.5 gm. of 13β-ethyl-Δ$^{4,9}$-gonadien-16α-ol-3,17-dione, 100 cc. of 2,2-dimethoxypropane and 10 cc. of methanol containing 1% of acetyl chloride were agitated for 15 minutes under nitrogen at room temperature. The solution was neutralized by the addition of triethylamine and distilled to dryness under vacuum. The residue was subjected to chromatography through silica with elution with benzene-ethyl acetate mixture (7:3) and 9.5 gm. of 3,3-dimethoxy-13β-ethyl-Δ$^{5(10),9(11)}$-gonadien-16α-ol-17-one were obtained which was utilized as such in the following step.

The compound occurred in the form of an amorphous cream colored product melting towards 60° C. and soluble in ethanol and chloroform, and insoluble in water.

I.R. spectra (chloroform):
Presence of cyclopentanone C=O at 1,742 cm.$^{-1}$, of OH at 3,531 cm.$^{-1}$ and of C—O—C.

U.V. spectra (ethanol):

Max. at 237 nm. $E^{1\%}_{1 cm.}$=415

Max. at 242 nm. $E^{1\%}_{1 cm.}$=430 or ε=14,900

Infl. towards 250 nm. $E^{1\%}_{1 cm.}$=290

Max. at 293 nm. $E^{1\%}_{1 cm.}$=32

Step F: 3,3-dimethoxy-13β-ethyl-17α-ethynyl-Δ$^{5(10),9(11)}$-gonadien-16α,17β-diol.—80 gm. of magnesium were introduced into 1800 cc. of ether and a stream of methyl bromide was bubbled therethrough for five hours under an inert atmosphere. The ether was distilled while maintaining a constant volume by addition of tetrahydrofuran. A 0.8 N solution of methyl magnesium bromide in tetrahydrofuran was obtained.

A stream of acetylene was bubbled for 30 minutes into 600 cc. of tetrahydrofuran under an inert atmosphere. Then 500 cc. of the 0.8 N solution of methyl magnesium bromide were added and the mixture was agitated for 30 minutes while maintaining the bubbling of acetylene therethrough under an inert atmosphere at room temperature. 5 gm. of 3,3-dimethoxy-13β-ethyl-Δ$^{5(10),9(11)}$-gonadien-16α-ol-17-one were introduced into 120 cc. of tetrahydrofuran while bubbling a stream of acetylene therethrough under an inert atmosphere. 250 cc. of the above ethynyl magnesium bromide solution were added while maintaining the temperature at 25° C. The mixture was agitated for 40 minutes with the bubbling of acetylene therethrough under an inert atmosphere. The excess of magnesium salt was destroyed by the addition of 100 cc. of an aqueous saturated solution of ammonium chloride. Then the mixture was extracted with ethyl acetate. The extract brought to dryness under vacuum weighed 5.6 gm. The residue was subjected to chromatography through silica with elution with a benzene-ethyl acetate mixture (5:5). 2.74 gm. of 3,3-dimethoxy-13β-ethyl-17α-ethynyl-Δ$^{5(10),9(11)}$-gonadien-16α,17β-diol were thus obtained in the form of an amorphous cream colored product which was soluble in chloroform and insoluble in water.

I.R. spectra (chloroform):
Presence of OH complex at 3,592 and 3,563 cm.$^{-1}$, of C≡CH at 3,297 cm.$^{-1}$ and of C—O—C.

Step G: 13β-ethyl - 17α - ethynyl-Δ$^{5(10),9(11)}$-gonadien-16α,17β-diol-3-one.—A mixture of 2.42 gm. of 3,3-dimethoxy-13β-ethyl - 17α - ethynyl-Δ$^{5(10),9(11)}$-gonadien-16α,17β-diol, 30 cc. of acetic acid and 6 cc. of water were agitated for one hour under nitrogen at room temperature. The solution was then poured into water and extracted with methylene chloride. The extracts were evaporated to dryness under vacuum. 1.90 gm. of 13β-ethyl-17α-ethynyl-Δ$^{5(10),9(11)}$-gonadien-16α,17β-diol-3-one were obtained in the form of a solid cream colored product melting at 189° C. and soluble in benzene and chloroform and insoluble in water.

Step H: 13β-ethyl-117α-ethynyl-Δ$^{4,9,11}$-gonatrien-16α, 17β - diol - 3-one.—1.90 gm. of 13β-ethyl-17α-ethynyl-Δ$^{5(10),9(11)}$ - gonadien - 16α,17β-diol-3-one were dissolved in 85 cc. of dioxan. 2.75 gm. of 2,3-dichloro-5,6-dicyanobenzoquinone were added thereto and the mixture was agitated for seven hours under nitrogen at room temperature. Next the mixture was vacuum filtered and the filtrate was rinsed with benzene. The filtrate diluted by two volumes of benzene was washed by an aqueous solution of sodium thiosulfate until it was decolored. Then it was washed with water. After drying over sodium sulfate, the solution was evaporated to dryness under vacuum. The residue was taken up with methylene chloride. The crystals were vacuum filtered, washed with methylene chloride and dried to obtain a residue weighing 1.34 gm. After recrystallization from refluxing ethyl acetate, 0.580 gm. of 13β-ethyl-17β-ethynyl-Δ$^{4,9,11}$-gonatrien-16α,17β-dione-3-one were obtained in the form of a solid cream colored product melting at 180° C. and soluble in chloroform and ethanol, and insoluble in water. Its specific rotation was $[\alpha]_D^{20}$=+137.5°±3.5° (c.=0.5%, chloroform).

By evaporation to dryness of the different mother liquors and subjecting the residue to chromatography through silica with elution with a benzene-ethyl acetate mixture (4:6), a second yield of 0.61 gm. of the product was recovered.

*Analysis.*—Calculated on the solvated product for $C_{21}H_{24}O_3$ (moceular weight=324.41) (percent): C, 77.26; H, 7.48. Found (percent): C, 76.9; H, 7.4.

I.R spectra (chloroform):
Presence of C≡CH at 3,298 cm.$^{-1}$, of OH complex and of trienone.

U.V. spectra (ethanol):

Max. at 237 nm. $E^{1\%}_{1 cm.}$=181

Max. at 269–270 nm. $E^{1\%}_{1 cm.}$=109

Max. at 342 nm. $E^{1\%}_{1 cm.}$=905 or ε=29,350

EXAMPLE 2

13β-ethyl-17α-ethynyl-Δ$^{4,9,11}$-gonatrien-16β,17β-diol-3-one

Step A: 3,3 - ethylenedioxy-13β-ethyl-Δ$^{5(10),9(11)}$-gonadien-16α-ol-17-one.—2 gm. of 3,3 - dimethoxy-13β-ethyl-Δ$^{5(10),9(11)}$-gonadien-16α-ol-17-one (obtained in step E of Example 1) were heated to 60° C. with 8 cc. of ethyleneglycol. 100 mg. of pyridine hydrochloride were added and the mixture was agitated for 10 minutes at 60° C. The reaction mixture was brought to room temperature and a solution of 0.3 cc. of triethylamine in 200 cc. of water was added. The mixture was then extracted with ethyl acetate. The organic phases were washed with water, dried over sodium sulfate and vacuum filtered. The filter was washed with methylene chloride and the combined filtrates were evaporated to dryness under vacuum. 1.13 gm. of 3,3 - ethylenedioxy - 13β - ethyl-Δ$^{5(10),9(11)}$-gonadien - 16α-ol-17-one were obtained in the form of a pale yellow amorphous product, soluble in chloroform and methylene chloride and insoluble in water.

Step B: 3,3 - ethylenedioxy - 13β - ethyl-17α-ethynyl-Δ$^{5(10),9(11)}$ - gonadien - 16α,17β - diol.—1.8 gm. of 3,3-ethylenedioxy - 13β - ethyl - Δ$^{5(10),9(11)}$ - gonadien-16α-ol-17-one were dissolved in 70 cc. of tetrahydrofuran. Over a period of thirty minutes while bubbling acetylene therethrough, 140 cc. of a solution of ethynyl magnesium bromide (obtained starting from a solution of 0.3 N methyl magnesium bromide through which a stream of acetylene was bubbled) was added. The mixture was agitated for a further hour at room temperature while maintaining the bubbling of acetylene therethrough. Next a saturated aqueous solution of ammonium chloride was added and the mixture was extracted with ethyl acetate.

The organic phases were washed with water, dried over sodium sulfate and evaporated to dryness under vacuum. The residue was subjected to chromatography through silica with elution with a benzene-ethyl acetate mixture (4:6). 1.2 gm. of 3,3 - ethylenedioxy - 13β - ethyl-17α-ethynyl-Δ5(10),9(11)-gonadien-16α,17β-diol was obtained in the form of an amorphous yellow product, soluble in chloroform and insoluble in water.

I. R. spectra (chloroform):
 Presence of C≡C, of C—O—C and of OH complex. Absence of ketone.

Step C: 3,3 - ethylenedioxy - 13β - ethyl-17α-ethylnyl-Δ5(10),9(11)-gonadien - 17β - ol - 16-one.—1.1 gm. of 3,3-ethylenedioxy - 13β - ethyl - 17α-ethylnyl-Δ5(10),9(11)-gonadiene-16α,17α-diol was dissolved in 20 cc. of acetone. The solution was cooled to 0° C. and 1.6 cc. of a Herbon-Jones solution, of the formula:

Chromic anhydride _____ gm__ 270
Concentrated sulfuric acid _____ cc__ 230
Water, q.s.p. 1 liter.

was added. The mixture was agitated for one hour at 0° C., then 0.5 cc. of methanol was added and the mixture was extracted with methylene chloride. The organic phases were washed with water. The aqueous phase was re-extracted with methylene chloride. The combined extracts were evaporated to dryness under vacuum. The residue was subjected to chromatography through silica with elution with a benzene-ethyl acetate mixture (4:6). 500 mg. of 3,3 - ethylenedioxy - 13β - ethyl - 17α - ethylnyl-Δ5(10),9(11)-gonadien-17β-ol - 16 - one were obtained in the form of a solid colorless product, melting at 142° C. and soluble in chloroform, slightly soluble in ether and insoluble in water.

I.R. spectra (chloroform):
 Presence of C≡C at 3,305 cm.$^{-1}$, of ketone at 1,759 cm.$^{-1}$, of OH and of ketal.

Step D: 3,3-ethylenedioxy - 13β - ethyl-17α-ethylnyl-Δ5(10),9(11)-gonadien-16β,17β-diol,—500 mg. of 3,3-ethylenedioxy - 13β - ethyl - 17α - ethylnyl-Δ5(10),9(11)-gonadien-17β-ol-16-one were mixed with 8 cc. of methanol and cooled to 0° C. 100 mg. of sodium borohydride was added and the suspension was agitated for two hours at 0° C. The temperature was then raised to 20° C., a further 60 mg. of sodium borohydride was added and the suspension was agitated for one hour at 20° C., then poured into water. The reaction mixture was extracted with ethyl acetate. The organic phases were washed with water, dried over sodium sulfate, and evaporated to dryness under vacuum. The residue, weighing 0.355 gm., was subjected to choromatography through silica with elution with a benzene-ethyl acetate mixture (4:6). 210 mg. of 3,3-ethylenedioxy - 13β - ethyl - 17α - ethynyl-Δ5(10),9(11)-gonadien-16β,17β-diol were obtained in the form of a solid colorless product, melting at 190° C. and soluble in chloroform and methanol and insoluble in water.

I.R. spectra ((chloroform):
 Presence of OH at 3,588cm.$^{-1}$, of C≡C. Absence of ketone.

Step E: 13β - ethyl - 17α - ethynyl-Δ5(10),9(11)-gonadien-16β,17β - diol - 3 - one.—200 mg. of 3,3-ethylenedioxy-13β - ethyl - 17α - ethynyl-Δ5(10),9(11)-gonadien-16β,17β-diol were dissolved in 6 cc. of 95% acetic acid solution and agitated for thirty minutes at room temperature. 1 cc. of water was added and the reaction mixture was allowed to stand overnight at room temperature. The solution was then poured into water and extracted with methylene chloride. The organic phases were washed with water, dried over sodium sulfate and evaporated to dryness under vacuum. 170 mg. of 13β-ethyl-17α-ethynyl-Δ5(10),9(11)-gonadien - 16β, 17β-diol-3-one were obtained which was used as such in the following step.

Step F: 13β - ethyl - 17α - ethynyl - Δ4,9,11-gonatrien-16β,17β - diol - 3 - one.—170 mg. of 13β - ethyl-17α-ethynyl-Δ5(10),9(11)-gonadien - 16β,17β - diol-3-one and 0.250 gm. of 2,3-dichloro-5,6-dicyano-benzoquinone were dissolved in 7.6 cc. of dioxan and agitated at 20° C. under nitrogen. The reaction mixture was allowed to stand at room temperature, then diluted with benzene. The benzenic phase was washed with a saturated aqueous solution of sodium thiosulfate until the wash waters were totally decolored. The wash waters were re-extracted with benzene. The combined benzenic phases were dried over sodium sulfate, filtered and evaporated to dryness under vacuum. The residue was subjected to chromatography through silica with elution with a benzene-ethyl acetate mixture (5:5). 100 mg. of 13β - ethyl - 17α - ethynyl-Δ4,9,11-gonatrien - 16β,17β - diol-3-one were obtained in the form of a pale yellow amorphous product, soluble in chloroform and benzene and insoluble in water. The specific rotation was $[\alpha]_D^{20} = +35.5° \pm 2°$ (c.=0.55% in ethanol).

I.R. spectra (chloroform):
 Presence of C≡C and of OH.
M.N.R. spectra (deutero-chloroform):
 18-ethyl: 53.5 to 60.5 and 67.5 Hz.
 C≡CH: 150 Hz.
 OH: 230 Hz.
 H$_{16}$: 257 Hz.
 H$_4$: 349 Hz.
 H$_{11}$ and H$_{12}$: 396 Hz.
U.V. spectra (ethanol):

Max. at 237 nm. $E_{1cm.}^{1\%} = 175$

Max. at 265 nm. $E_{1cm.}^{1\%} = 104$

Infl. towards 282 nm. $E_{1cm.}^{1\%} = 122$

Max. at 343 nm. $E_{1cm.}^{1\%} = 758$ or ϵ 24,600

EXAMPLE 3

Pharmacological studies (1) Determination of the anti-gonadotrophic activity.—The anti-gonadotrophic activity was determined on rats in puberty weighing about 200 gm. 13β-ethyl-17α-ethynyl-Δ4,9,11-gonatrien-16α,17β-diol-3-one, utilized in solution in sesame seed oil containing 5% of benzylic alcohol was administered orally in 12 treatments over a period of 14 days, at a daily dosage level of 1 mg. per animal. The 15th day the rats were sacrificed by carotid bleeding and the seminal vesicles, prostate, testicles and suprarenals were separated and weighed.

The results obtained are given in Table I.

TABLE I

| Lots | Daily dose, mg. | Testicles, mg. | Seminal vesicles, mg. | Prostate, mg. | Suprarenals, mg. |
|---|---|---|---|---|---|
| Controls | 0 | 2,648 | 667.6 | 387.4 | 43.0 |
| Product studied | 1 | 1,835 (−30%) | 62.5 (−91%) | 42.6 (−89%) | 50.9 (+19%) |

In a second test, the product studied, 13β-ethyl-17α-ethynyl-Δ4,9,11-gonatrien-16α,17β-diol-3-one, was administered at a daily dosage rate of 100 and 500γ subcutaneously, under the same experimental conditions. The results obtained are given in Table II.

TABLE II

| Lots | Daily dose | Testicles, mg. | Seminal vesicles, mg. | Prostate, mg. | Suprarenals, mg. |
|---|---|---|---|---|---|
| Controls | 0 | 3,100 | 845.2 | 518.4 | 51.2 |
| Product studied | 100γ | 2,900 | 478.2 (−44%) | 276.1 (−47%) | 44.9 |
|  | 500γ | 2,600 | 97.4 (−88%) | 133.8 (−75%) | 56.3 |

13β-ethyl-17α-ethynyl-$\Delta^{4,9,11}$-gonatrien - 16β,17β - diol-3-one, administered under the same experimental conditions, subcutaneously, gave the results shown in Table III.

TABLE III

| Lots | Daily dose | Testicles, mg. | Seminal vesicles, mg. | Prostate, mg. | Suprarenals, mg. |
|---|---|---|---|---|---|
| Controls | 0 | 3,100 | 845.2 | 518.4 | 51.2 |
| Product studied | 100γ | 3,000 | 647.1 (−24%) | 358.5 (−31%) | 50.2 |
|  | 500γ | 3,000 | 649.9 (−24%) | 358.8 (−31%) | 47.1 |
|  | 2.5 mg. | 2,800 | 296.4 (−65%) | 246.4 (−53%) | 46.5 |

It can be noted from these results, that the products studied possess an anti-gonadotrophic activity from a clear predominance of anti-LH and that they do not provoke suprarenal aplasia.

(2) Anti-progesterone activity.—The anti-progesterone activity was determined by the Clauberg test. According to this test, immature rabbits were previously sensitized by daily subcutaneous administration of 10 μg. of estradiol benzoate for five days. Next they were treated for five days simultaneously with 200γ of progesterone and 13β-ethyl-17α-ethynyl-$\Delta^{4,9,11}$-gonatrien - 16α,17β - diol-3-one at different doses. The animals were sacrificed on the 11th day and, on the sections of the uterus, the inhibition of the proliferation of lacey endometria, characteristic of an anti-progestomimetic action, was noted in MacPhail units. The results obtained are given in Table IV.

TABLE IV

| Lots | Method of administration | Daily doses | MacPhail units |
|---|---|---|---|
| Progesterone | Subcutaneously | 200γ | 3 |
| Product studied | Orally | 2 mg. | 0.25 |
| Product studied plus | Orally | 2 mg. | 2.2 |
| Progesterone | Subcutaneously | +200γ |  |
| Product studied | Orally | 10 mg. | 0.25 |
| Product studied plus | Orally | 10 mg. | 1.60 |
| Progesterone | Subcutaneously | +200γ |  |
| Progesterone | Subcutaneously | 200γ | 2.2 |
| Product studied | do | 5 mg. | 0.5 |
| Product studied plus | Subcutaneously | 5 mg. | 1.8 |
| Progesterone | do | +200γ |  |

13β - ethyl-17α-ethynyl-$\Delta^{4,9,11}$-gonatrien-16β,17β-diol-3-one, administered under the same experimental conditions gave the results shown in Table V.

TABLE V

| Lots | Method of administration | Daily doses | MacPhail units |
|---|---|---|---|
| Progesterone | Subcutaneously | 200γ | 2.2 |
| Product studied | do | 5 mg. | 0.4 |
| Product studied plus | Subcutaneoulsy | 5 mg. | 1.1 |
| Progesterone | do | +200γ |  |
| Product studied | Orally | 10 mg. | 0.3 |
| Product studied plus | Orally | 10 mg. | 1.6 |
| Progesterone | Subcutaneously | +200γ |  |

It can be noted from these results that the two products studied possess a clear anti-progesterone activity with reference to a 200γ daily dose of progesterone.

(3) Exogenic anti-androgenic activity.—The exogenic anti-androgenic activity was determined with reference to testosterone propionate in castrated male rats, according to the Lerner method described by Dorfman in "Methods in Hormone Research," II, p. 320.

Young male rats aged about four weeks were castrated. The treatment commenced the day following castration and lasted for seven days. The eighth day the animals were sacrificed and the prostate, seminal vesicles and levator ani were separated. 13β - ethyl - 17α-ethynyl-$\Delta^{4,9,11}$-gonatrien-16α,17β-diol-3-one and testosterone propionate were utilized in sesame seed oil containing 5% of benzylic alcohol. The compounds were separately administered subcutaneously, the product studied at doses of 200γ and 1 mg., testosterone propionate at a dose of 50γ (daily dosages per rat).

The following groups of rats were constituted:

(a) a control group receiving the solvent;
(b) a group of rats administered 50γ of testosterone propionate subcutaneously;
(c) a group of rats administered 200γ or 1 mg. of the product studied subcutaneously;
(d) a group of rats receiving 200γ or 1 mg. of the product studied subcutaneously and 50γ of testosterone propionate subcutaneously.

The following Table VI shows the results obtained.

TABLE VI

| Lots | Daily dosages | Fresh levator ani, mg. | Seminal vesicles, mg. | Prostate, mg. |
|---|---|---|---|---|
| Controls | 0 | 29.3 | 9.7 | 10.2 |
| Testosterone propionate | 50γ | 49.5 | 112.8 | 147.0 |
| Product studied | 200γ | 25.2 | 18.0 | 11.8 |
| Product studied plus | 200γ | 49.1 | 120.3 | 120.3 |
| Testosterone propionate | +50γ |  |  |  |
| Product studied | 1 mg. | 20.2 | 19.3 | 11.3 |
| Product studied plus | 1 mg. | 42.9 | 97.3(−15%) | 113.7(−25%) |
| Testosterone propionate | +50γ |  |  |  |

It can be noted from these results that the product studied exerted a clear anti-androgenic activity at a dose of 1 mg. with reference to a 50γ daily dose of testosterone propionate.

(4) Anti-estrogenic activity.—The anti-estrogenic activity of 13β-ethyl-17α-ethynyl-$\Delta^{4,9,11}$-gonatriene-16α,17β-diol-3-one was determined on immature mice according to a technique inspired from the Rubin test, Endo., 1951, 49, 429, and close to that of Dorfman et al. (Methods in Hormone Research, 1962, vol. II, 118).

The estrogen utilized was estradiol. Female mice aged 19 to 21 days received for three days as a daily subcutaneous injection, either estradiol alone, or the product studied alone, or the product studied and estradiol. In the last case, the two steroids were injected into different areas. The mice were sacrificed the fourth day and their uteri were separated and weighed.

Estradiol, in solution in sesame seed oil containing 5% of benzylic alcohol, was administered at a total dose of 0.27γ, each injection being a volume of 0.1 cc. per mouse. The product studied was utilized in solution in sesame seed oil containing 5% of benzylic alcohol, and administered in total doses of 30, 90 and 270γ. The injections were also made in a volume of 0.1 cc. per mouse.

The results obtained are given in Table VII.

TABLE VII

| Lots | Total dosage | Average weight of the uterus in mg. |
|---|---|---|
| Controls | 0 | 15.4 |
| Estradiol | 0.27γ | 44.2 |
| Product studied | 30γ | 22.7 |
| Product studied plus Estradiol | 30γ +0.27γ | 42.8 |
| Product studied | 90γ | 31.9 |
| Product studied plus Estradiol | 90γ +0.27γ | 33.2 (−25%) |
| Product studied | 270γ | 33.3 |
| Product studied plus Estradiol | 270γ +0.27γ | 33.5 (−24%) |

These results show that 13β-ethyl-17α-ethynyl-$\Delta^{4,9,11}$-gonatrien-16α,17β-diol-3-one possessed a clear anti-estrogenic activity with reference to estradiol at a dose of 90γ.

(5) Claudogenic activity.—The claudogenic activity was determined according to the process described by Pincus-Banik, Proc. Soc. Exp. Biol. Med., 1962, vol. III, 595. Adult rats are coupled. Day 1 of gestation is that where the presence of spermatozoids in the vaginal smears were noted. 13β-ethyl-17α-ethynyl-$\Delta^{4,9,11}$-gonatrien-16α,17β-diol-3-one, utilized in solution in sesame seed oil containing 5% of benzylic alcohol, was administered at doses of 50γ and 200γ, either orally or subcutaneously, for three consecutive days, day 1, day 2 and day 3 of gestation. The animals were sacrificed ten days later and the points of implantation were counted. The fertility rate represents the average of the number of implantations found in the coupled rats.

Table VIII gives the results obtained.

TABLE VIII

| Lots | Method | Dosage | Fertility rate |
|---|---|---|---|
| Controls | Subcutaneously | 0 | 10.0 |
| Product studied | do | 50γ | 7.0 |
|  |  | 200γ | 0 |
| Controls | Orally | 0 | 10.0 |
| Product studied | do | 50γ | 2.6 |
|  |  | 200γ | 0 |

These results show that 13β-ethyl-17α-ethynyl-$\Delta^{4,9,11}$-gonatrien-16α,17β-diol-3-one possesses an important claudogenic activity beginning at the dose of 50γ, administered either orally or subcutaneously.

The preceding specific embodiments are illustrative of the practice of the invention. It is to be understood, however, that other expedients known to those skilled in the art or disclosed herein may be employed without departing from the spirit of the invention or the scope of the appended claims.

We claim:
1. Ethynylated trienic steroids having the formula

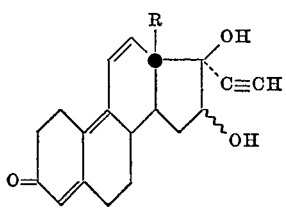

wherein R represents alkyl having 1 to 3 carbon atoms and the ∼OH in the 16 position is selected from the group consisting of the α-OH and the β-OH.

2. The ethynylated trienic steroid of claim 1 wherein R is ethyl and the OH in the 16 position is α-OH.

3. The ethynylated trienic steroid of claim 1 wherein R is ethyl and the OH in the 16 position is β-OH.

4. The process of producing the ethynylated trienic steroids of claim 1 consisting essentially of the steps of (1) reducing the aromatic ring bond of a compound having the formula

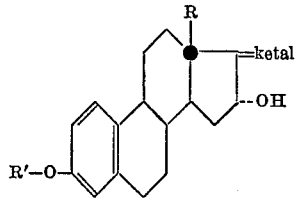

wherein R represents alkyl having 1 to 3 carbons, R' represents lower alkyl and ketal represents a ketal of the 17 ketone, by the action of an alkali metal in liquid ammonia in the presence of a lower alcohol, (2) selectively hydrolyzing the enolic ether in the 3 position of the resulting dienic compound having the formula

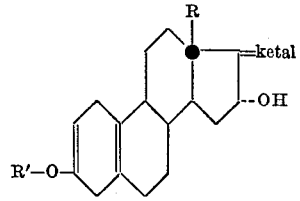

wherein R, R' and ketal have the above-assigned values, by the action of an organic carboxylic acid having 2 to 6 carbon atoms, (3) brominating the resulting $\Delta^{5(10)}$-steroid having the formula

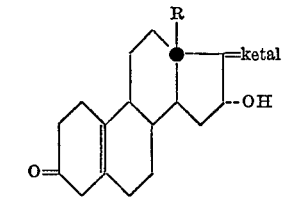

wherein R and ketal have the above-assigned values, by the action of a brominating agent in an alkaline medium followed by dehydrobromination, (4) hydrolyzing the resulting $\Delta^{4,9}$-dienic steroid having the formula

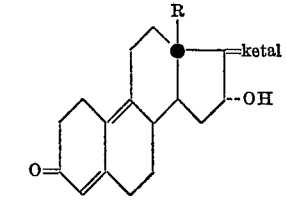

wherein R and ketal have the above-assigned values, by the action of an aqueous strong acid, (5) selectively ketalizing the 3-ketone of the resulting $\Delta^{4,9}$-dienone steroid having the formula

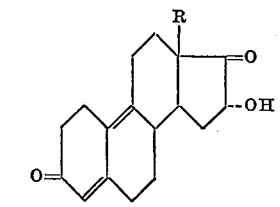

wherein R has the above-assigned values, by the action of a ketalizing agent in the presence of a ketalization catalyst, (6) ethynylating the resulting 3-ketal having the formula

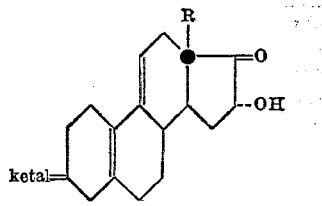

wherein R and ketal have the above-assigned values, by the action of a metallic ethynylating reactants, (7) recovering the 17α-ethynyl compound having the formula

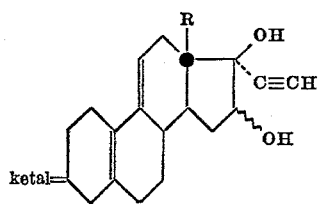

wherein R and ketal have the above-assigned values and the ~OH in the 16 position is selected from the group consisting of the α-OH and the β-OH, (8) hydrolyzing the said 17α-ethynyl compound by the action of an acid to remove the ketal, (9) dehydrogenating the resulting $\Delta^{5(10),9(11)}$-dienone having the formula

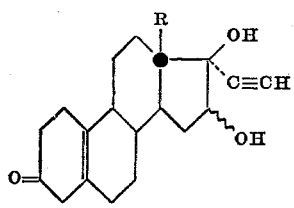

wherein R and ~OH have the above-assigned values, by the action of a dehydrogenating substituted p-benzoquinone, and (10) recovering said ethynylated trienic steroids.

5. The process of claim 4, step (7), wherein said 17α-ethynylated compound is recovered where ~OH in the 16 position is the α-OH.

6. The process of claim 4, step (7), wherein said 17α-ethynylated compound is recovered where ~OH in the 16 position is the α-OH, the resulting product is subjected to the action of an oxidation reaction, the resulting 16-ketone having the formula

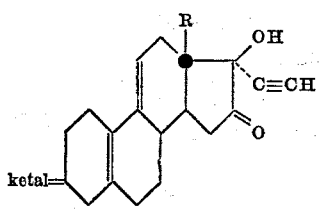

wherein R and ketal have the values assigned in claim 4, is reacted with a ketonic reducing agent, said 17α-ethynylated compound is recovered where ~OH in the 16 position is the β-OH, steps (8) and (9) are conducted on the 16β-OH compound and said ethynylated trienic compound is recovered where the ~OH in the 16 position is the β-OH.

7. 17-ketals of $\Delta^{5(10)}$-enolones having a formula selected from the group consisting of

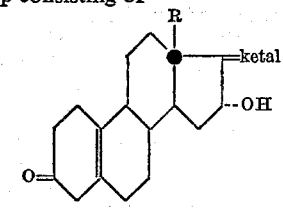

and

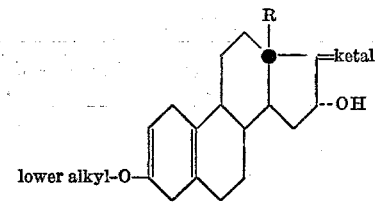

wherein R represents alkyl having 1 to 3 carbon atoms, and ketal represents a member selected from the group consisting of di-alkoxy having 1 to 4 carbon atoms in the alkoxy, and alkylenedioxy having 2 to 4 carbon atoms in the alkylene.

8. $\Delta^{4,9}$-dienic steroids having the formula

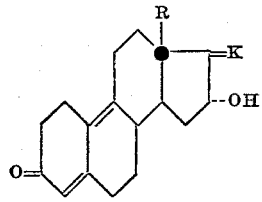

wherein R represents alkyl having 1 to 3 carbon atoms and K represents a member selected from the group consisting of oxygen, di-alkoxy having 1 to 4 carbon atoms in the alkoxy, and alkylenedioxy having 2 to 4 carbon atoms in the alkylene.

9. $\Delta^{5(10),9(11)}$-dienic steroids having the formula

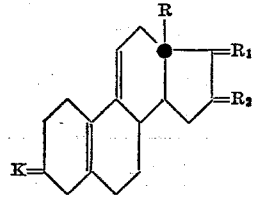

wherein R represents alkyl having 1 to 3 carbon atoms, $R_1$ represents a member selected from the group consisting of

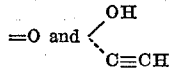

$R_2$ represents a member selected from the group consisting of

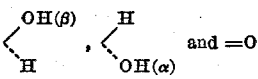

and K represents a member selected from the group consisting of oxygen, di-alkoxy having 1 to 4 carbon atoms in the alkoxy, and alkylenedioxy having 2 to 4 carbon atoms in the alkylene.

References Cited
UNITED STATES PATENTS 3,086,027  4/1963  Perelman et al. _____ 260—397.3
3,644,436  2/1972  Wendt et al. _____ 260—397

HENRY A. FRENCH, Primary Examiner

U.S. Cl. X.R.

260—397.3, 397.4, 397.45, 397.5; 424—243

UNITED STATES PATENT OFFICE
CERTIFICATE OF CORRECTION

Patent No. 3,790,564           Dated February 5, 1974

Inventor(s) Andre Pierdet et al

It is certified that error appears in the above-identified patent and that said Letters Patent are hereby corrected as shown below:

Patent

| Col. | Line | |
|---|---|---|
| 1 | 1 | "alhylenedioxy" should be -- alkylenedioxy -- |
|  | 66 | "3β" should be -- 13β -- |
| 0 | 16 | "was" should be -- of -- |
| 2 | 1 | "117α" should be -- 17α -- |
| 2 | 29 | "moceular" should be -- molecular -- |
| 3 | 42 | "ethylnyl" should be -- ethynyl -- |
| 4 | 13 | After "stand" please insert -- overnight -- |
| 9 | 51 | In Claim 5, the following phrase was omitted after "α-OH," -- Steps 8 and 9 are conducted on the 16α-OH compound and said ethynylated trienic steroid is recovered where the —OH in the 16 position is the α-OH -- |

Signed and sealed this 7th day of January 1975.

(SEAL)
Attest:

McCOY M. GIBSON JR.          C. MARSHALL DANN
Attesting Officer            Commissioner of Patents